Oct. 24, 1944.  J. L. HIPPLE  2,361,100
AGRICULTURAL IMPLEMENT
Filed Jan. 27, 1943

Inventor:
James L. Hipple,
By Paul O. Pippel
Attorney.

Patented Oct. 24, 1944

2,361,100

UNITED STATES PATENT OFFICE 2,361,100

AGRICULTURAL IMPLEMENT

James L. Hipple, Canton, Ill., assignor to International Harvester Company, a corporation of New Jersey Application January 27, 1943, Serial No. 473,721

8 Claims. (Cl. 111—69)

This invention relates to agricultural implements and more particularly to a material-dispensing apparatus adapted for connection to a tractor or other support.

For convenience, the invention will be described in its application to seed planters; however, it should be understood that the invention may be utilized in conjunction with other implements, as, for example, fertilizer distributors.

In seed planters, the seed-dispensing mechanism is generally mounted upon and rides behind an earth-working tool adapted to open up a furrow in the ground for reception of seed, and the seed container is operated by mechanism mounted upon the implement support. Where a tractor is employed to support the implement, the seed-dispensing mechanism may be operated by a sprocket and chain assembly driven from the rear axle of the tractor. For practical purposes the seed dispenser is often attached to the beam supporting the earth-working tool, the entire planting unit being pivotally connected to the tractor, and mechanism being provided for raising and lowering the tool with respect to the ground. The present invention is particularly important when utilized in conjunction with a planter unit wherein the tool employed for opening a furrow in the ground for the deposition of seed is laterally movable to positions near one or the other rear wheel of the tractor with which it is associated in order to permit the tractor wheels to travel on unplowed ground without adjusting the spacing of the wheels and still secure the desired row spacing upon reversing direction at the end of a row. Such mechanism for laterally moving an earth-working tool is shown and described in copending United States application, Serial No. 400,370, to which reference may be had for a fuller disclosure of the means by which the working tool is shifted. With such an arrangement, if the seed dispenser is connected to the earth-working tool and allowed to move laterally with it, the chain drive is thrown out of alinement, and the chain becomes disengaged from the sprocket.

The present invention is designed to overcome this difficulty simply and effectively and has for an object the provision of an independent mounting for a seed dispenser with respect to the ground-working or furrow-opening tool.

Another object is the provision of means for associating the seed dispenser with a laterally movable furrow-opening tool in such a manner as to avoid dislocation of the driving connections for the seed-dispensing mechanism when the furrow-opening tool is shifted.

These and other objects will become apparent from the following detailed description when read in conjunction with the accompanying drawing, in which.

Figure 1:
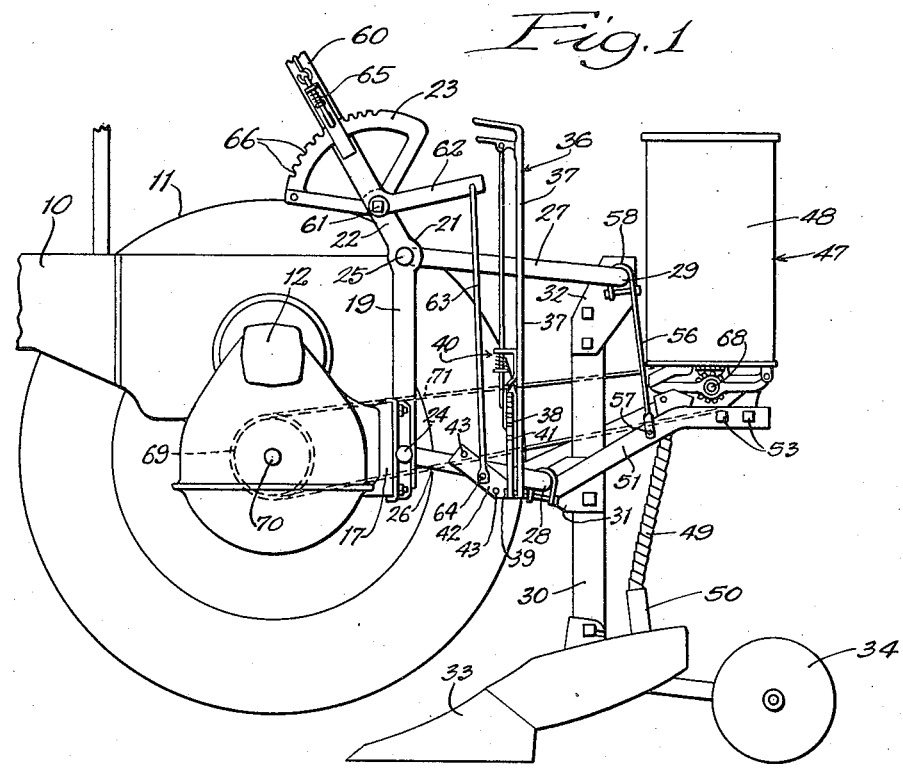
Figure 1 is a view in side elevation of the rear end of a tractor with one wheel removed and with the planter unit embodying the features of the present invention attached thereto.
Figure 2:
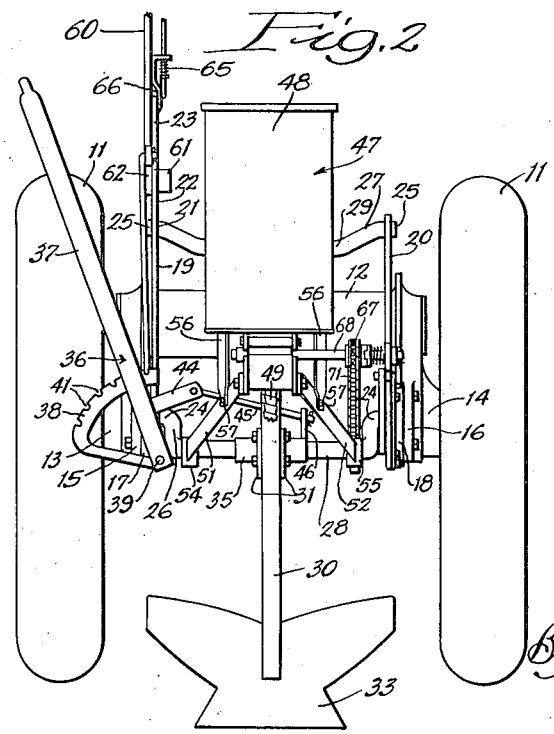
Figure 2 is a rear view in elevation of the mechanism shown in Figure 1.
Figure 3:
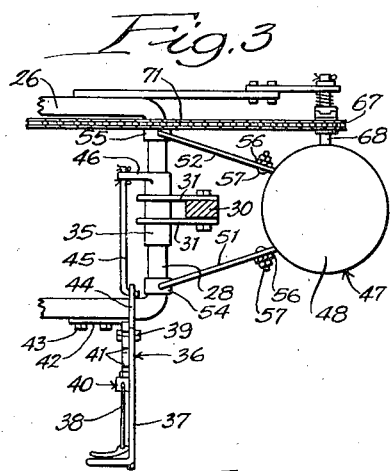
Figure 3 is a top plan view of a portion of the mechanism shown in Figures 1 and 2 with parts broken away to indicate the mounting of the seed dispenser with respect to the furrow-opening tool.

Referring to the drawing, it will be observed that the planter unit is connected to a tractor having a body portion 10, rear wheels 11, and a transverse rear axle structure comprising a main axle housing 12 and depending stub axle housings 13 and 14. Portions 15 and 16 are provided on the stub axle housings, and vertically extending plates 17 and 18 are bolted thereto for the attachment of the implement to the tractor. Affixed to the plates 17 and 18 are vertically extending brackets 19 and 20, the bracket 19 on the left side of the tractor being bent forwardly at 21 to form an arm 22 having affixed to the end thereof a quadrant 23. Brackets 19 and 20 are provided with vertically spaced openings to receive for vertical pivotal movement the outwardly turned legs 24 and 25 of a pair of vertically spaced lifting bails 26 and 27 extending rearwardly and having parallel transverse portions 28 and 29. A vertically extending tool beam 30 is provided with spaced brackets 31 and 32 affixed thereto and having openings to receive respectively the transverse portions 28 and 29 for vertical pivotal movement. Mounted upon the lower end of the beam 30 is a furrow-opening tool 33 in the form of a "middle buster" having a covering disc 34 mounted to ride therebehind. Pivotal connection of the bracket 31 to the transverse portion 28 of lifting bail 26 is made through the intermediary of a sleeve 35 which is adapted for sliding movement axially of the transverse portion 28. It is thus seen that, with this arrangement and the loose mounting of the bracket 32 on the upper bolt member, lateral movement of the beam 30 with respect to the tractor may be permitted to effect shifting of the furrow opener to positions near one or the other side of the rear wheels of the tractor. This lateral shifting of the furrow-opening tool is of considerable importance when utilized with narrow tread tractors, since it permits the operator to secure proper row spacing in traveling back and forth across the field while the tractor travels on unplowed ground.

The lateral shifting of the working tool is effected by a manual control mechanism indicated generally at 36 and including a lever 37, a quadrant 38 on which the lever is pivoted at 39, and a detent mechanism 40 of conventional form adapted to engage the notches 41 in the quadrant. The quadrant is supported upon the left side of the lower bail 26 by a forwardly extending portion in the form of a bracket 42 integral with the quadrant and affixed to the bail by bolts 43. Projecting laterally from the lever 37 and affixed thereto, as by welding, is a bracket 44 having one end of a link 45 pivotally connected thereto, the other end of said link being connected to an arm 46 projecting radially from the sleeve 35 and integral therewith.

Mounted to the rear of the tool beam 30 is a seed-dispensing mechanism of conventional form, generally indicated at 47 and including a seed can 48 and a seed spout 49 of a telescopic and flexible type, the lower end of which is inserted in a seed cup 50 mounted upon the working tool and adapted to direct seed into the furrow made thereby. The dispensing unit is supported independently of the tool beam by brackets 51 and 52 affixed to the dispenser by bolts 53. These brackets extend forwardly and downwardly and are provided at their forward ends with bosses 54 and 55 adapted to accommodate the transverse portion 28 of the bail 26 for pivotal engagement with respect thereto, said bosses being mounted upon opposite ends of the portion 28. The dispensing unit is connected to the transverse portion 29 of the upper bail 27 by straps 56 attached to the brackets 51 and 52 at 57 and having hooks 58 loosely connected upon the bail 27 by bolts 59.

Raising and lowering of the planter unit to and from ground-working position is accomplished by a lever 60 pivoted on the quadrant 23 at 61 and provided with a rearwardly extending arm 62 having an opening in the end thereof to receive the bent end of a link 63, the lower end of which is attached at 64 to the bracket 42. The planter unit is retained in the desired vertical position by a conventional detent mechanism 65 adapted to engage notches 66 in quadrant 23. The seed dispenser is operated from the tractor by a sprocket and chain assembly comprising a sprocket 67 keyed to a seed dispenser drive shaft 68, a sprocket 69 shown in dotted lines in Figure 1 mounted upon the stub axle 70 on the tractor, and a chain 71 connecting the two sprockets. When it is desired to raise the planter unit from ground-working position, the lever 60 is moved forward. Its arm 62 rises and, through its connection with the link 63 attached to bracket 42, the bails 26 and 27 move upwardly about their respective points of pivot 24 and 25, carrying the planter unit with it. When it is desired to laterally shift the tool beam 30, the lever 37 is manipulated, the detent mechanism 40 being utilized to affix the working tool in the chosen position. In such case it will be observed that the seed dispenser 41 does not partake of the movement imparted to the tool beam but retains its original position, the length and flexibility of the seed spout 49 being such that it follows the working tool and continues to deposit seed in the shifted position.

It will now be observed that a simple and effective mounting of a seed dispenser with respect to a transversely movable tool bar has been provided, whereby the driving connections for the dispenser mechanism are maintained in proper alinement at all times, regardless of the position of the working tool.

Having now described the invention, it should be understood that variations may be made in the number and arrangement of parts without departing from the spirit of the invention or the scope of the appended claims.

What is claimed is:

1. In combination, an implement support, an implement pivotally connected to the support for vertical movement, said implement including a ground-working tool and a material dispenser, means for simultaneously vertically moving the working tool and the material dispenser to and from ground-working position, and means for shifting the working tool laterally with respect to the dispenser.

2. In combination, an implement support, an implement including a ground-working tool and a material dispenser, means pivotally connecting the implement to the support including vertically spaced parallel links, means for connecting the implement to said links for vertical movement therewith, and means for moving the said working tool laterally with respect to said material dispenser.

3. In combination, an implement support, an implement including a ground-working tool and a material dispenser, means pivotally connecting the implement to the support including vertically spaced parallel links, means for connecting the implement to said links for vertical movement therewith, driving means upon said support, driven means upon said dispenser in substantial alinement with said driving means, means transmitting motion from said driving means to said driven means, and means for laterally shifting the ground-working tool with respect to the material dispenser without disturbing the alined relationship of the said driving means to the said driven means.

4. In combination, an implement support, an implement including a ground-working tool and a material dispenser, means pivotally connecting the implement to the support including vertically spaced parallel links, means for mounting said dispenser upon said links for vertical movement therewith, means for mounting said working tool upon said links for vertical movement therewith, and means for laterally shifting said working tool with respect to said support independently of said material dispenser.

5. In combination, a tractor having a transverse rear axle structure and spaced drive wheels mounted thereupon, means for attaching an implement to the rear axle structure including a frame, rearwardly extending bail means pivotally connected to the frame for vertical movement, an implement including a ground-working tool and a material dispenser, means for connecting the implement to the bail means for vertical movement therewith, and means for shifting the working tool laterally independently of the material dispenser to dispose the working tool in position near one or the other of said spaced drive wheels.

6. In combination, a tractor having a transverse rear axle structure and spaced drive wheels mounted thereupon, means for attaching an implement to the rear axle structure including a frame, rearwardly extending, vertically spaced, generally parallel bail means pivotally connected to the frame for vertical movement with respect to the tractor, an implement including a ground-working tool and a material dispenser, means for connecting the implement to the bail means for vertical movement therewith, means mounted on the frame for moving the implement to and from ground-working position, means for mounting the material dispenser on the bail means independently of the working tool, means for mounting the working tool on the bail means for transverse movement with respect to the tractor, and means mounted on the bail means for effecting transverse movement of the working tool with respect to the material dispenser.

7. In combination, a tractor having a transverse rear axle structure and spaced drive wheels mounted thereupon, means for attaching an implement to the rear axle structure including a frame, rearwardly extending, vertically spaced, generally parallel bail means pivotally connected to the frame for vertical movement with respect to the tractor, an implement including a ground-working tool and a material dispenser, means for connecting the implement to the bail means for vertical movement therewith, means mounted on the frame for moving the implement to and from ground-working position, means for mounting the material dispenser on the bail means independently of the working tool, means for mounting the working tool on the bail means for transverse movement with respect to the tractor, driving means on the tractor, driven means on the material dispenser in alinement with said driving means, means transmitting motion from said driving means to said driven means, and means mounted on the bail means for effecting transverse movement of the working tool without disturbing the alined relationship of said driving means to said driven means.

8. In combination, an implement support, an implement connected to the support for vertical movement, said implement including a ground-working tool for forming a furrow and a material dispenser for depositing material in said furrow, means for simultaneously vertically moving said tool and said dispenser to and from ground-working position, and means for laterally shifting said tool with respect to said dispenser without impairing the deposition of material in the furrow formed by said tool.

JAMES L. HIPPLE.